US012811962B2

(12) United States Patent
Lee et al.

(10) Patent No.: US 12,811,962 B2
(45) Date of Patent: Nov. 24, 2026

(54) THREAT RELEVANCY BASED ON USER AFFINITY

(71) Applicant: International Business Machines Corporation, Armonk, NY (US)

(72) Inventors: Cheng-Ta Lee, Cumming, GA (US); Brijrajsinh Jhala, Edison, NJ (US); Edward Philip Gurnee, Dunwoody, GA (US); Roberto G. Campbell, Atlanta, GA (US); Zhida Ma, Alpharetta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 380 days.

(21) Appl. No.: 18/050,900

(22) Filed: Oct. 28, 2022

(65) Prior Publication Data

US 2024/0146749 A1 May 2, 2024

(51) Int. Cl.
*H04L 9/40* (2022.01)

(52) U.S. Cl.
CPC ........ *H04L 63/1425* (2013.01); *H04L 63/104* (2013.01)

(58) Field of Classification Search
CPC ....... H04L 63/10; H04L 63/104; H04L 63/14; H04L 63/1425
See application file for complete search history.

(56) References Cited

U.S. PATENT DOCUMENTS

| | | | | |
|---|---|---|---|---|
| 8,903,593 | B1 | 12/2014 | Addepalli et al. | |
| 9,985,982 | B1 * | 5/2018 | Bartos | H04L 63/1425 |
| 10,536,478 | B2 | 1/2020 | Kirti et al. | |
| 10,721,254 | B2 | 7/2020 | Kotinas et al. | |
| 2014/0282977 | A1 | 9/2014 | Madhu et al. | |
| 2020/0252421 | A1 | 8/2020 | Pendergast et al. | |
| 2020/0259852 | A1 * | 8/2020 | Wolff | G06N 7/01 |
| 2021/0195442 | A1 * | 6/2021 | Agarwal | H04W 24/02 |
| 2021/0382911 | A1 * | 12/2021 | Nelson | G06F 16/27 |
| 2022/0116291 | A1 * | 4/2022 | Hines | H04L 41/069 |
| 2022/0131889 | A1 * | 4/2022 | Scheideler | G06F 21/554 |
| 2023/0237781 | A1 * | 7/2023 | Cheng | G06V 10/7747 382/155 |
| 2024/0054406 | A1 * | 2/2024 | Bhise | G06F 18/2163 |
| 2024/0106846 | A1 * | 3/2024 | Kapoor | H04L 63/10 |

FOREIGN PATENT DOCUMENTS

| | | | |
|---|---|---|---|
| CN | 105378790 | B | 6/2020 |
| TW | I709874 | B | 11/2020 |

* cited by examiner

*Primary Examiner* — Trong H Nguyen
*Assistant Examiner* — Ayub A Maye
(74) *Attorney, Agent, or Firm* — Matthew M. Hulihan, Esq.; Tihon Poltavets, Esq.; Heslin Rothenberg Farley & Mesiti P.C.

(57) ABSTRACT

Embodiments of the present disclosure provide enhanced threat relevancy identification user affinity of users within a security system. Security-related training data within a security system including indicators of compromise (IoC), security observables, and artifacts are evaluated and enriched to provide training data enrichment results for features collection. Clusters of users are created based on similarity of training data enrichment results between users. A risk posture of a cluster of users is determined based on relevancy of a risk detected by a user in the user cluster.

19 Claims, 5 Drawing Sheets

THREAT RELEVANCY BASED ON USER AFFINITY

BACKGROUND

The present disclosure relates to the data processing field, and more specifically, to methods and systems for threat relevancy identification based on user affinity within a security system.

Identifying threat relevancy poses a major challenge of providing effective Threat Intelligence (TI) for various threat detection security systems. Many threats and attacks occur daily, including for example, phishing, malware, ransomware, Denial-of-Service (DoS), botnet, Advanced Persistent Threat (APT), and the like. Users consume threat reports to understand the risk posture to prepare or respond to the threats. Security Operation Centers (SOC) typically have too few people to keep up with hackers and other adversaries of the associated organization. As such, a significant problem for current threat-detection security techniques includes existing limitations in identifying the relevant threats. This problem leads to deficiencies in threat prioritization of current systems such as the identified threat priorities may not be related to an actual relevancy of detected potential threats. New threat insights are needed to respond to the increasing numbers of threats and attacks, and more specifically, new effective techniques are needed for identifying the relevant threats.

SUMMARY

Embodiments of the present disclosure are directed to identifying threat relevancy based on user affinity within a security system. A non-limiting example computer-implemented method for identifying threat relevancy includes accessing security-related training data within a security system, the training data comprise indicators of compromise (IoC), security observables, and artifacts. The method comprises enriching the training data to provide training data enrichment results for features collection. Clusters of users are created based on a similarity of training data enrichment results between users. A risk posture of a cluster of users is determined based on relevancy of a threat risk detected by a user in the user cluster. This method provides enhanced threat relevancy identification of potential threats for both an individual user and a cluster of users so that many potential threats can be identified as not relevant and eliminated. This method determines an accurate and effective threat risk posture of a threat risk detected by a user using a threat relevancy identification from training data enrichment results. Operation of this method does not require any user interaction or user input from either the individual user or the cluster of users, while providing enhanced threat relevancy identification.

In accordance with disclosed embodiments, another non-limiting computer implemented method comprises splitting the security-related training data two sets based on a maliciousness found in the training data enrichment results. The security-related training data sets comprise a first set for benign activities and a second set for malicious threats. The disclosed method enables efficient and accurate creating clusters of users.

In one embodiment, another non-limiting computer implemented method comprises aggregating collected features for at least a first user, defining a first user profile of aggregated features for the first user, and creating the clusters based on the first user profile. Creating clusters of users using aggregated user features to define the first user profile enables the user clusters to be created more efficiently and the user clusters can provide enhanced threat relevancy identification.

Other disclosed embodiments include a computer system and computer program product for performing threat relevancy identification based on user affinity implementing features of the above-disclosed method.

DETAILED DESCRIPTION

Figure 1:
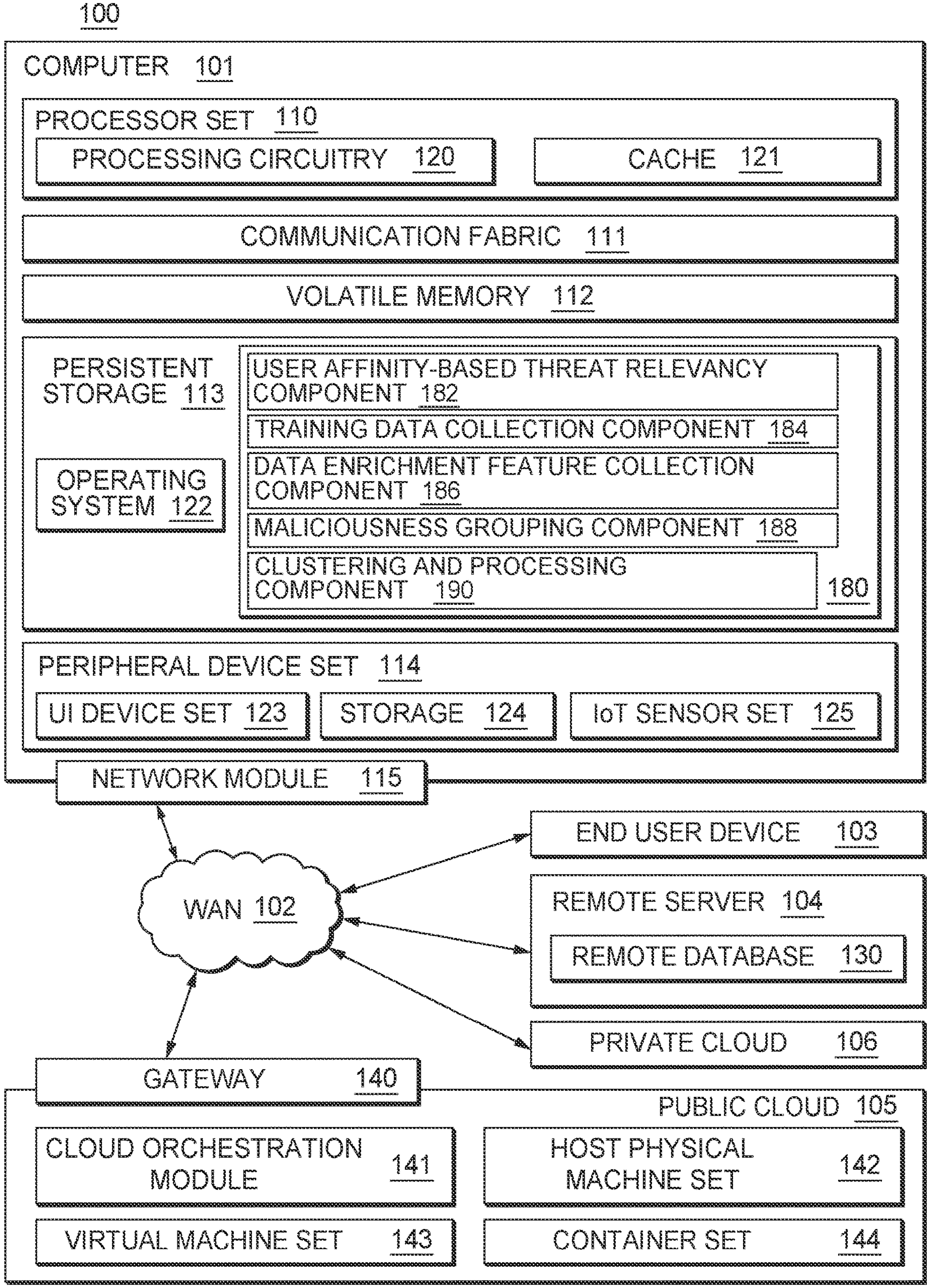
FIG. 1 is a block diagram of an example computer environment for use in conjunction with one or more embodiments of a security system for identifying threat relevancy based on user affinity.

Current threat-detection security techniques generally fail to accurately identify the relevancy of detected potential threats. As a result, effective threat information is not provided to users while the numbers of threats and attacks continues to increase. Embodiments of the present disclosure provide new effective techniques enabling accurate and effective threat relevancy identification. In one embodiment, a method identifies user affinity, collects and enriches indicators of compromise (IoC), security observables, and artifacts training data to provide training data enrichment results for features collection. Using the training data enrichment results between users enables efficiently creating effective clusters of users. The created clusters of users enable accurate and effective identification of threat relevancy of detected potential threats. The disclosed method identifies relevant threats while others potential threats are identified as not relevant and eliminated from consideration. This method determines a threat risk posture of a threat risk detected by a user using a threat relevancy identification from training data enrichment results. Operation of the disclosed method provides an effective risk posture of potential detected threats for users, without any user interaction or user input.

Embodiments of the present disclosure provide enhanced threat relevancy identification using identified user affinity for users within a security system. Evaluating user affinity may include processing security-related training data to identify users with related or similar missions and related attack surfaces in security operations. Related or similar missions in security operations encompass a similar security risk posture and security strategy for users in an organization's network. Related attack surfaces encompass hardware and software that connects to an organization's network that include similar possible points where an unauthorized user can access a user's system and extract data. Enriched collected training data, IoCs, security observables, and artifacts provide training data enrichment results for features collection enabling enhanced threat relevancy identification of potential threats for an individual users and creation of clusters of users. Effective clusters of users having related missions and attack surfaces can be efficiently created based similarity of training data enrichment results between users in security operations. The created clusters of users enable efficiently and effectively identifying a threat risk posture of detected potential threats. An advantage of the disclosed embodiments is that security-related training data within a security system can be collected without requiring any user input or user interaction. In some embodiments, the training data includes indicators of compromise (IoC), security observables, and artifacts. Creating clusters of users may be performed based on similarity of the security-based training data between users in the security system. Determining a risk posture of a cluster of users may be based on relevancy of a risk detected by a user in the cluster of users.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, there is shown an example computing environment 100. Computing environment 100 contains an example of an environment for the execution of at least some of the computer code involved in user affinity-based threat relevancy methods at block 180, such as user affinity-based threat relevancy component 182, training data collection component 184, data enrichment feature collection component 186, maliciousness grouping component 188, and clustering and processing component 190. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network component 115. Remote server 104 includes remote database 130. Public cloud 105 includes gateway 140, cloud orchestration component 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide enhanced threat relevancy identification based on user affinity of users within a security system. In some embodiments, security-related data can be collected from a variety of users. For example, based on previous user-provided queries (e.g., when a user transmits a query to request a risk assessment for a given a piece of data), the system may generate clusters of users such that users having high affinity (e.g., similar queries/risk concerns) are grouped together. In some embodiments, prior to such clustering, the system may enrich the data, such as enrich an URL to get a list of resolved IP addresses. In some embodiments, this enrichment is a multi-phase enrichment, such as where the results of a first enrichment operation are themselves enriched using a second enrichment operation.

When a new query is received (or a user or user system otherwise identifies a potential-risk for a piece of data), the system may identify a corresponding cluster based on users' country, users' industry, and the like, and determine a risk posture of the corresponding cluster with respect to the new query or concern. For example, the system may determine whether other user(s) in the cluster have already queried about or identified the piece of data, whether the data was already identified as risky by user(s) in the group, whether the piece of data has been enriched and identified as malicious, such as a malware type or a threat group name, and the like. In this way improvements are made because threat relevancy is determined based on user affinity.

User affinity may be determined by evaluating and enriching training data to provide training data enrichment results for features collection. In some embodiments, the training data comprises information such as indicators of compromise (IoC), security observables, and artifacts. In some embodiments, new and/or historical queries are used to identify user affinity, which can then be used to create cluster users. In one embodiment, a new query made by a user can be more relevant than historical queries to the other users in the same cluster, and the new query may be considered to calculate the relevancy if another user in the same user group already made the same enrichment request. Clusters of users can be created based on a similarity of training data enrichment results between users. A risk posture of a cluster of users (e.g., how risky a given item or element is) can then be determined based on relevancy of the risk(s) detected by a user in the user cluster.

In some embodiments, the security-related training data may be split into two sets based on a maliciousness found in the training data enrichment results. For example, the security-related training data sets may comprise a first set for benign activities and a second set for malicious threats. In one such embodiment, separating benign activities from malicious threats when clustering may enable more efficient and accurate clustering or creating user groups/clusters. Using the set of malicious threats enables providing training data enrichment results between users for malicious threats without the benign activities. These training data enrichment results between users enable efficiently creating effective clusters of users. These user clusters can provide enhanced threat relevancy identification. The created user clusters can be used to more efficiently and accurately determine a threat risk posture of detected threat risks.

Figure 2:
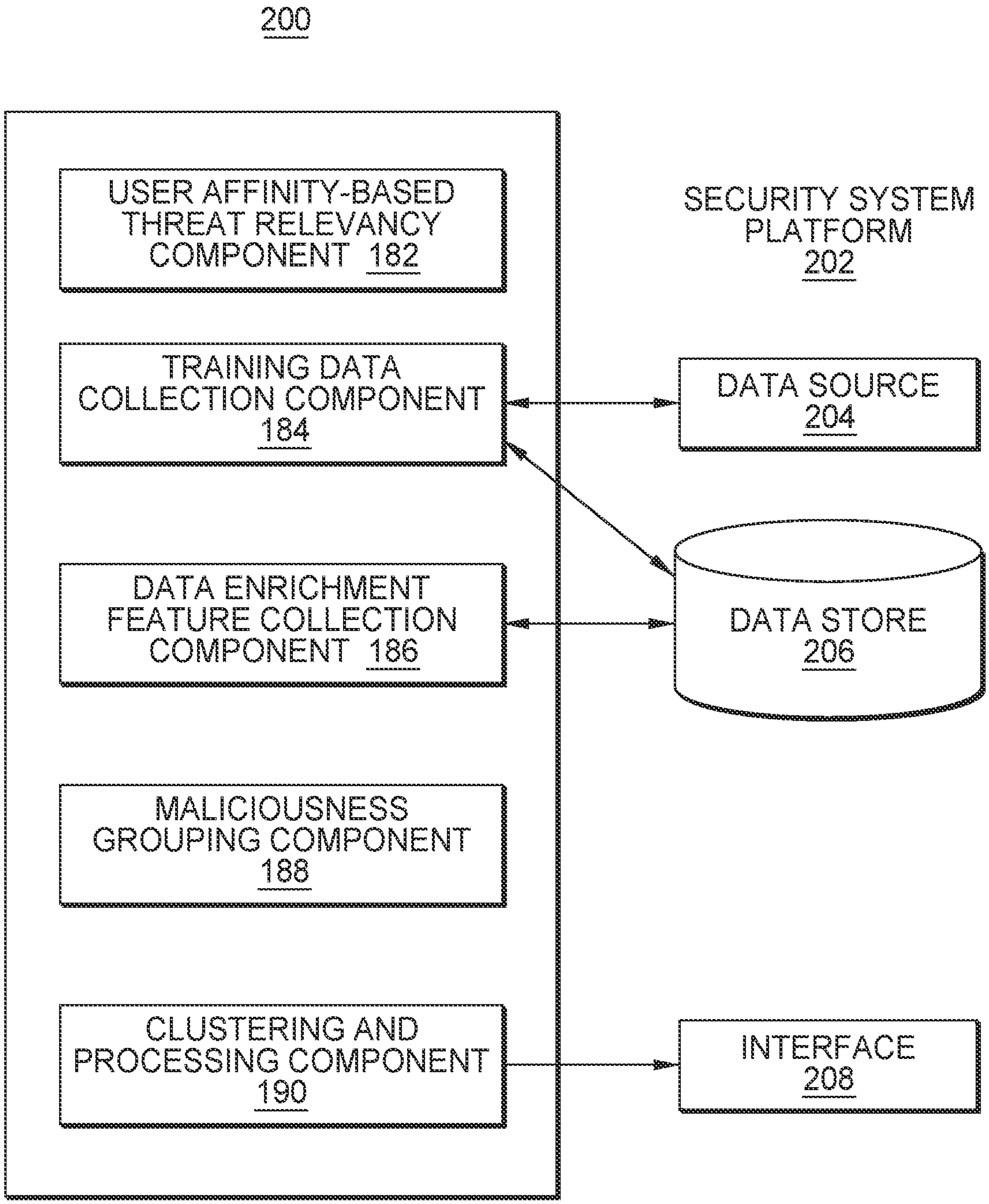
FIG. 2 is a block diagram of an example components of a security system for identifying threat relevancy based on user affinity in accordance with one or more disclosed embodiments.

In one embodiment, creating clusters of users based on similarity of the training data enrichment results between the users includes aggregating collected features for at least a first user, defining a first user profile of aggregated features for the first user, and creating the clusters based on the first user profile. With the defined user profile, clusters of users based similarity of training data enrichment results between users can be efficiently created. Using the aggregated user features to define the first user profile enable more efficiently creating user clusters that can provide enhanced threat relevancy identification. The created user clusters with the user profile can be used to efficiently and accurately determine a threat risk posture of detected threat risks, without any user interaction or user input With reference now to FIG. 2, there is shown an example security system 200 in accordance with one or more disclosed embodiments for identifying threat relevancy based on user affinity. Security system 200 can be used in conjunction with computer 101 and cloud environment of the computing environment 100 of FIG. 1 for identifying threat relevancy based on user affinity. Security system 200 includes a security system platform 202 providing a framework of services and hosting security system applications.

In accordance with disclosed embodiments, security system 200 includes user affinity-based threat relevancy component 182, training data collection component 184, data enrichment feature collection component 186, maliciousness grouping component 188, and clustering and processing component 190, together enabling features of threat relevancy identification based on user affinity.

Security system platform 202 can be implemented using various currently available platforms offered by cloud service providers, such as with IBM® Threat Intelligence Insights of IBM Cloud Pak® for Security (CP4S) and various security products, such as X-Force Exchange (XFE) portal, which is a cloud based threat intelligence sharing platform. Am-I-Affected is a feature of the IBM® Threat Intelligence Insights of IBM Cloud Pak® for Security (CP4S) optionally implementing security platform 202. For example, see https://exchange.xforce.ibmcloud.com/link to open resource.

In accordance with the disclosed embodiments, user affinity-based threat relevancy component 182 of security system 200 includes various components, including training data collection component 184. In some embodiments, the training data collection component 184 enables collecting and providing security-related training data without any user input or user intervention. The training data may comprise, for example, indicators of compromise (IoC), security observables, and/or artifacts. Indicators of compromise (IoC) include pieces of data that identify potentially malicious activity on a system or network, such as, unusual network traffic, unknown files, applications or processes in the system. Security observables, and/or artifacts include traces left behind for a given threat, such as virus signatures, IP addresses, malware files, and the like.

The training data collection component 184 can collect and provide security-related training data, for example, using a data source 204 and a data store 206 of security system 200. An example security system data source 204 includes systems such as Am-I-Affected, which can automatically scan new IoCs of users and determine whether threat is relevant (e.g., malicious) or not after the scan. For example, training data collection component 184 can receive training data IoCs from the currently available product, Am-I-Affected from data source 204. In some embodiments, the data store 206 can store enriched data, such as enriched IoCs, security observables, and/or artifacts for queries from users (e.g., historical user queries), and can provide stored data to the training data collection component 184.

In some embodiments, the data enrichment feature collection component 186 in security system 200 enriches collected training data (e.g., from training data collection component 184) to generate training data enrichment results (also referred to as enriched training data in some embodiments) for features collection. In the illustrated embodiment, the data enrichment feature collection component 186 receives or generates the enriched training data and stores these enriched results, for example using the security system data store 206.

In some embodiments, the maliciousness grouping component 188 in security system 200 splits or delineates the training data (or the enriched training data) into multiple sets based on the maliciousness found or reflected in the training data enrichment results. For example, the maliciousness grouping component 188 may divide the enriched training data into two sets: a first set corresponding to benign activities, and a second set of malicious activities. For example, using the separate malicious threats enables effective user grouping/clustering to help users to focus on relevant threats.

In some embodiments, clustering and processing component 190 creates clusters of users based on a relevancy or similarity of the training data enrichment results between users. For example, the clustering and processing component may use one or more clustering techniques or algorithms to cluster the enriched training data from each user (e.g., the IoCs provided by each user) based on similarity of the enrichment features of each IoC (e.g., as determined during the enrichment operations). For example, the enriched features used for clustering may include features such as the URLs reflected in the enriched data for a given user, IP addresses relevant to IoC queries for the given user, countries associated with IoCs associated with the given user, and the like.

In at least one embodiment, the clustering and processing component 190 clusters the enriched training data on an aggregated basis. That is, the clustering and processing component 190 may generate aggregated enriched data (referred to in some embodiments as a user profile or an aggregated user profile), where this profile reflects the aggregate risk profile of the user. For example, the profile may indicate the relevant features for the user based on the enrichment results of IoCs provided by or otherwise associated with the user. As an example, the user profile may indicate specific URLs, IP addresses, countries of origin, or other contextual features (generated by the enrichment component) that are associated with the user's IoCs, that have been seen a threshold number of frequency of times in association with the user's IoCs, and the like.

By generating clusters based on these aggregated profiles, the clustering and processing component 190 groups related users (e.g., those with high affinity) together, such that users in the same cluster tend to exhibit similar risk postures (e.g., having similar IoCs, attack surfaces and threat risks).

As discussed above, in some embodiments, the system can first split the training data based on maliciousness. For example, the clustering and processing component 190 may generate a first set of clusters based on a first aggregated profile for each user (e.g., based on IoC data that was determined to be benign), and a second set of clusters based on a second aggregated profile for each user (e.g., based on IoC data that was determined to be malicious).

In some embodiments, clustering and processing component 190 can further provide a determined or generated threat relevancy result based on user affinity, using the clusters. For example, the risk posture of a cluster of users (with respect to a given IoC or other risk) may be determined based on relevancy of the risk detected by users in the user cluster. That is, if a user wishes to know whether a given piece of data (e.g., IoC) is malicious or risky, the clustering and processing component 190 may determine how risky the piece of data is with respect to the cluster to which the user belongs.

As one example, the clustering and processing component 190 may determine whether other users in the same cluster previously queried about or identified the piece of data/IoC. If so, it may indicate that the piece of data is more relevant and/or risky to the user. As another example, if multiple users in the same cluster identify the same piece of data/IoC, the clustering and processing component 190 may automatically determine that it may be a newly-relevant piece of data. In one embodiment, the clustering and processing component 190 can transmit or otherwise provide a notification or alert to other user(s) in the cluster, indicating that the specific piece of data has recently been flagged by other similar users. This can allow proactive security.

In the illustrated example, the clustering and processing component 190 provides threat insights to an interface 208 of security system platform 202. In some embodiments, the interface 208 can receive threat insights or queries and/or provide notifications or responses. For example, users (or user systems) may query or transmit IoCs or other data via the interface 208, asking the 182 to evaluate the relevancy or riskiness of the data (e.g., based on user affinity) and the interface 208 may be used to return the determined relevancy and/or level of risk. As another example, the interface 208 may be used to provide proactive notifications and a risk posture to a cluster of users, as discussed above.

Figure 3:
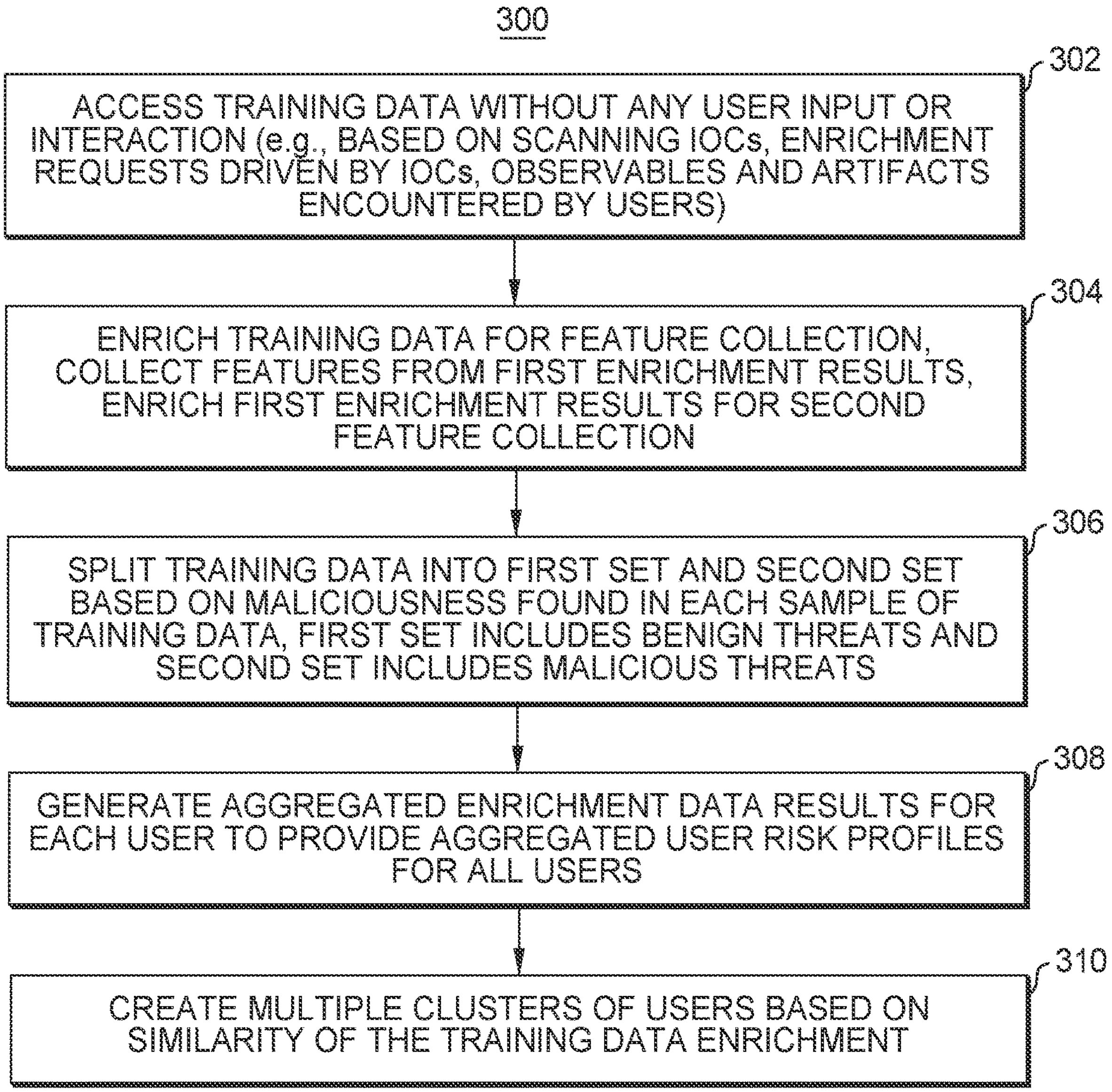
FIG. 3 is a flow chart illustrating example operations of one or more disclosed embodiments of a security system identifying threat relevancy based on user affinity.

Referring also to FIG. 3, example operations are shown of a computer-implemented method 300 for identifying threat relevancy based on user affinity in accordance with one or more disclosed embodiments. Method 300 may be implemented with computer 101 for example, with operations of method 300 controlled by the user affinity-based threat relevancy component 182 used together with training data collection component 184, data enrichment feature collection component 186, maliciousness grouping component 188, and clustering and processing component 190.

At block 302, training data is accessed, e.g., actively collected in the security system 200, for example, without requiring any user input or interactions. The security-related training data may include, for example, indicators of compromise (IoC), security observables, and/or artifacts. In some embodiments, the security-related training data collection at block 302 does not rely on user input, and collecting the training data can be performed without any user interactions. Security-related training data may be collected, for example, by automatically scanning new IoCs in users' local context (e.g., data on the user's device(s) or local computing system). In some embodiments, training data can be collected based on user entered queries, and user lookup IoC observables. Enrichment requests driven by IoCs, observable and artifacts encountered by users in threat management can also be used for calculating the user affinity to identify users with related attack surfaces, and the determined user affinity can be used to effectively cluster users. Related attack surfaces may encompass, for example, hardware and software that connects to an organization's network that include similar possible points where an unauthorized user can access a user's system and extract data.

At block 304, the training data is enriched for feature collection, the enriched training data for example, may include specific URLs, IP addresses, countries of origin, and other contextual features generated by the enrichment component 186 that are associated with the collected IoCs. In some embodiments, multi-phase enrichment operations can be performed for feature collection. For example, features may be collected for first enrichment results in phase 1 enrichment, and then first enrichment results are enriched for a second feature collection in phase 2 enrichment. For example, a URL can be enriched in phase 1 enrichment, providing enrichment results including a list of resolved IP addresses. The IP addresses can be enriched in phase 2 enrichment, providing an Autonomous System Number (ASN) and country code. Enrichment operations of enriching enrichment results can be repeated until sufficient features are collected to group users based on user affinity. Grouping users based on user affinity may include collecting features from enrichment results to identify users having similar missions and/or attack surfaces in security operations. Grouping users based on user affinity may include identifying features from enrichment results to identify users that are targeted by the same threat group or impacted by the same malware campaigns.

Example features extracted from IoC enrichment may include information such as the data source of the IoCs, Categorization (type of IP address), IP reputation (ASN, country, city, and Categorization), Sighting (country, city, and industry), Actors (Email address, WHOIS Record, and Threat group name), TTPs (Related TTP and TTP categorizations), Campaigns, (Campaign name and Campaign type), Incidents (Incident type), Infrastructure, (Related Command and Control (C2) IPs/domains, Email address, infrastructure provider and countries, cities), Malware (Malware family name, Malware type), and Vulnerabilities (Common Vulnerabilities and Exposures (CVE) #, Vulnerability type and Impacted platform/software).

At block 306, training data optionally can be split into two sets based on a maliciousness found in training data enrichment results provided by the multi-phase enrichment operations at block 304. For example, the security-related training data sets may comprise a first set of benign activities and a second set of malicious threats. In one such embodiment, the enrichment results may indicate if given IoCs are malicious, and separating benign threats from malicious threats when clustering may enable more efficient and accurate clustering or creating user groups/clusters. In some embodiments, the system can leverage these ensembles of multiple clustering systems to combine the results from each to determine the relevancy or riskiness of any new query.

At block 308, aggregated enrichment data results are generated for each user, for example providing a user profile or an aggregated user risk profile for the users. For example, the aggregated user risk profile can provide specific enriched risk features, such as URLs, IP addresses, countries of origin together with aggregated frequency of the features that are associated with the user's IoCs, security observables, and artifacts.

At block 310, multiple clusters of users are created based on a similarity of training data enrichment results between users. That is, the data is clustered based on the features extracted or generated during data enrichment. By generating clusters based on these aggregated profiles at block 308, the clustering and processing component 190 groups users with high affinity together to create the clusters. As a result, each of users in a respective cluster have similar IoCs, attack surfaces, and threat risks and related risk postures. In some embodiments, existing and new users can be assigned to clusters based on their own aggregated/summarized features, and the risk posture of the existing or new user with respect to a given IoC can be determined based on the risk posture of other user's in the cluster.

For example, user clusters can be defined or generated based on the aggregated collected features, for example using one-hot encodings. Using t-Distributed Stochastic Neighbor Embedding (t-SNE) can be used for visualizing user clusters, for example by giving each data point a location in a two or three-dimensional map.

For example, a clustering system model based on k-means can be used to implement enhanced clusters of users. Of particular interest is the k-means variant bisecting k-means, which can also be used to identify the ideal number of clusters for the data. While K-means is a useful tool for clustering, it can miss certain patterns in higher dimensional data. This is because k-means groups data points that are closer together but oftentimes patterns in data defy that intuition. Bisecting k-means addresses this issue by identifying clusters of any arbitrary shape or size. It is also highly parallelizable by splitting the data at each step into two clusters using k-means. This step continues recursively until reaching k=N, where N is the number of items in the dataset. We use the Euclidean distance measure to sort data items into clusters. This process builds a hierarchy of clusters starting from k=1 to k=N. As part of the cluster selection, the hierarchy of clusters, or dendogram, is examined. The dendogram used jointly with an elbow method allows for a robust selection of clusters. A profile is built for each user which is input to the clustering system. The profile is built from enrichment requests. The set of enriched IoCs are aggregated to form the user profile which is used by the clustering system.

Figure 4:
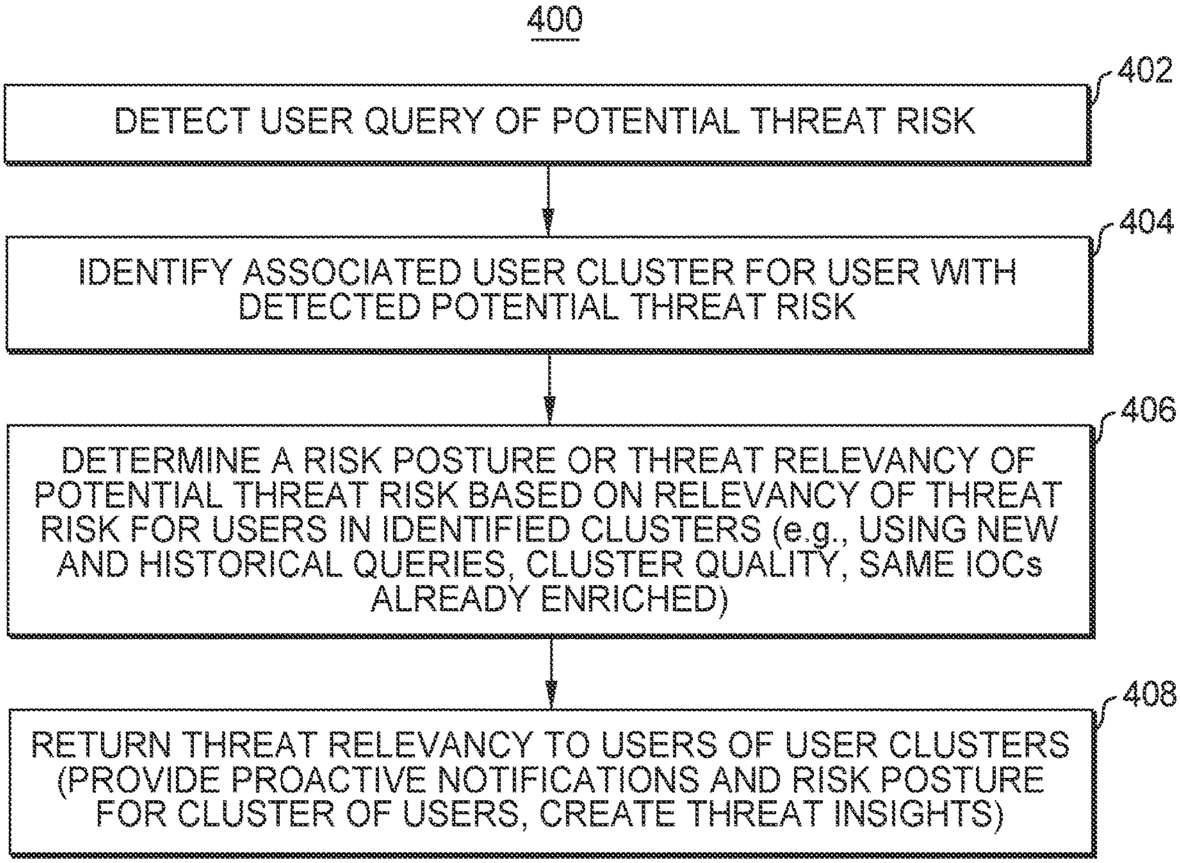
FIG. 4 is a flow chart illustrating example operations for identifying threat risk of one or more disclosed embodiments of a security system identifying threat relevancy based on user affinity.

Referring to FIG. 4, example operations for identifying threat posture are shown of a method 400 for identifying threat relevancy based on user affinity of one or more disclosed embodiments. Method 400 may be implemented with computer 101 for example, with operations of method 400 controlled by the user affinity-based threat relevancy component 182 used together with training data collection component 184, data enrichment feature collection component 186, maliciousness grouping component 188, and clustering and processing component 190.

At block 402, a user query or IoC of a potential threat risk is detected for a user in the security system. At block 404, an associated user cluster (or user clusters) are identified for the user of the detected potential threat risk. For example, as discussed above, the system may identify the cluster(s) of the user based on the user's aggregated features/user profile. At block 406, a risk posture and/or risk relevancy of potential risk threat can be determined based on the relevancy of the detected risk for users in the identified cluster of users (or clusters, such as if the system users one set of clusters for benign threats and one set of clusters for malicious ones). That is, the risk posture of the given/current detected risk can be determined based on its risk posture for other users in the associated user clusters, for example using new and historical queries. For example, when a user detects a potential risk, the potential risk or relevancy of the data can be determined based whether the other users in the cluster also have made the same enrichment request or otherwise identified the potential risk, whether they have already identified it as risky, and the like In some embodiments, the user group cluster quality can be considered in the determination of the risk posture and threat relevancy at block 406. For example, a sparse group may be less effective than a condensed group (e.g., where the determined posture or relevancy may be weighted lower if the cluster is sparse, as compared to if it is dense). In some embodiments, calculating threat relevancy includes checking if users in the same group have already enriched the same observables or IoCs.

At block 408, threat relevancy is returned to users of the user cluster or user clusters, to provide proactive notifications and a risk posture for the cluster of users. In some embodiments, new proactive notifications can be created based on the new enrichment requests that have been made by the users in the same group/cluster, as discussed above. Additionally, in some embodiments, new threat insights can be created by identifying the linkages between the observables, such as file hash and IoCs enriched in the same user cluster.

Figure 5:
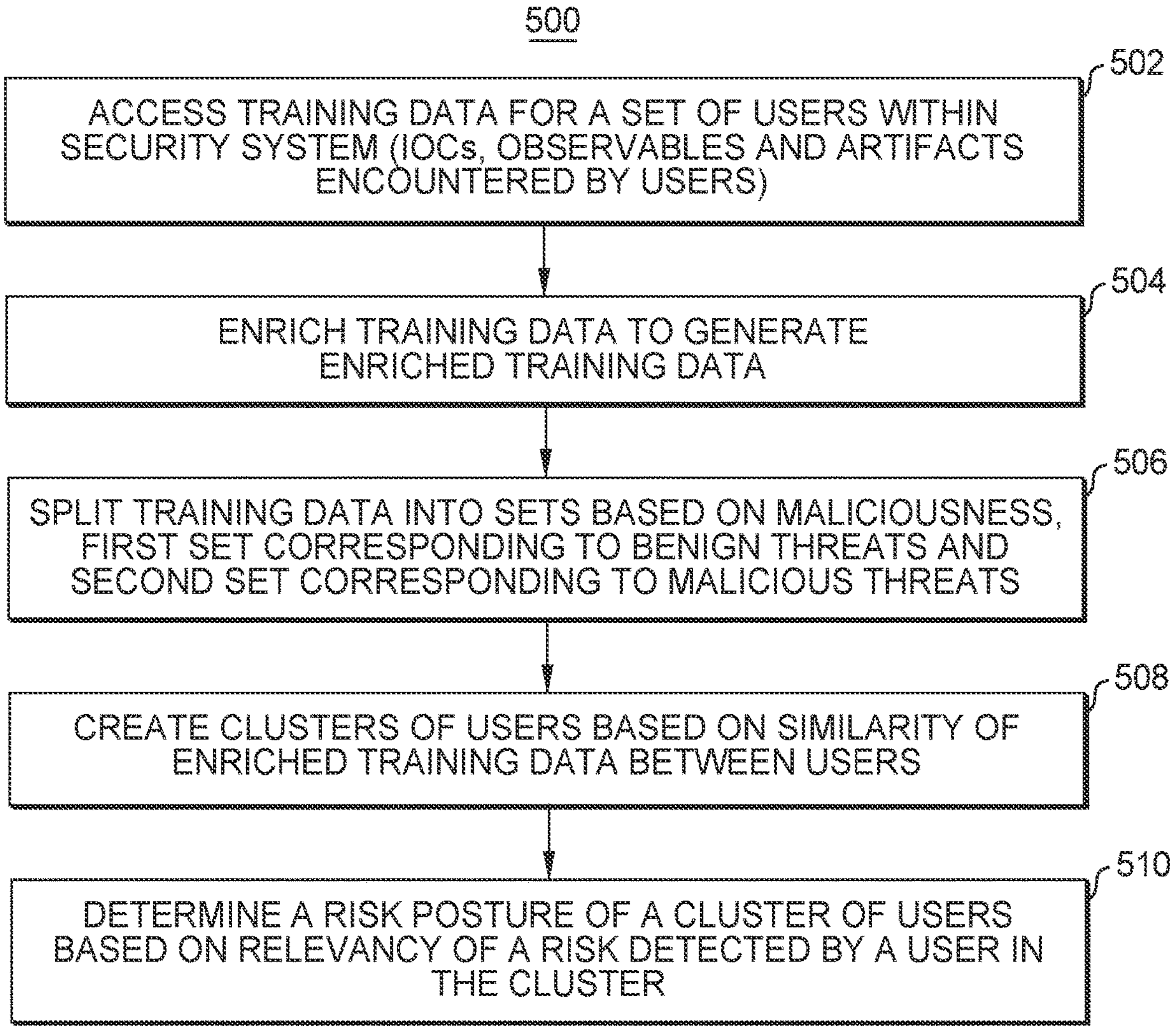
FIG. 5 is a flow chart illustrating example operations of one or more disclosed embodiments of a security system identifying threat relevancy based on user affinity.

Referring also to FIG. 5, example operations are shown of a computer-implemented method 500 for identifying threat relevancy based on user affinity in accordance with one or more disclosed embodiments. Method 500 may be implemented with computer 101 for example, with operations of method 300 controlled by the user affinity-based threat relevancy component 182 used together with training data collection component 184, data enrichment feature collection component 186, maliciousness grouping component 188, and clustering and processing component 190.

At block 502, training data is accessed, e.g., actively collected in the security system 200. At block 504, the training data is enriched to generate enriched training data. At block 506, the enriched training data optionally can be split into multiple sets before clustering. For example, the enriched training data optionally can be split into two sets based on a maliciousness, the sets comprising a first set corresponding to benign activities and a second set corresponding to malicious threats. At block 508, clusters of users are created based on similarity of the enriched training data between users. At block 510, a risk posture of a cluster of users is determined based on relevancy of a risk detected by a user in the cluster.

In brief summary, user affinity-based threat relevancy component 182 provides a new security model to prioritize threat insights and reports. User affinity-based threat relevancy component 182 uses enrichment requests from users to drive the creation of threat intelligence, and provides effective processes to produce the relevant threat intelligence. User affinity-based threat relevancy component 182 can apply the same mechanisms to other data types in security platforms. For example, user affinity-based threat relevancy component 182 can learn from other cases that users create, and can also learn from processed data and findings of currently available security platforms. User affinity-based threat relevancy component 182, for example, helps users to focus on relevant threats and provide threat intelligence enhancing capacity of their associated Security operations Center (SoC).

While the foregoing is directed to embodiments of the present invention, other and further embodiments of the invention may be devised without departing from the basic scope thereof, and the scope thereof is determined by the claims that follow.

What is claimed is:

1. A method comprising:

accessing training data from a set of users within a security system, by a processor executing a security system platform in the security system, wherein the training data is automatically collected without any user interaction, and is based on an attack surface and monitored user entered queries of each user of the set of users, the monitored user entered queries including queries transmitted by users, of the set of users, requesting a risk assessment of data, the training data comprising at least one of: indicators of compromise (IoC), security observables, or artifacts;

enriching the training data, by the processor executing the security system platform, to generate enriched training data by:

applying a first enrichment operation to the training data to generate initial enriched training data, wherein the first enrichment operation uses collected feature data associated with at least one of the IoCs, security observables, or artifacts for the users, the collected feature data comprising at least one of email addresses, uniform resource locators (URLs), internet protocol (IP) addresses, or countries of origin; and applying a second enrichment operation to the initial enriched training data to generate the enriched training data, wherein the second enrichment operation uses types of vulnerabilities;

creating clusters of the users, by the processor executing the security system platform, based on a similarity of the enriched training data between the users;

determining a risk posture, by the processor executing the security system platform, of a cluster of users based on relevancy of a risk detected by a user in the cluster, wherein the relevancy of the risk is based at least in part on whether one or more other users in the cluster of users have previously queried about, or made an enrichment request, for the risk; and providing proactive notifications, without user input, by the processor executing the security system platform, to the cluster of users based on the relevancy of the risk detected by the user in the cluster.

2. The method of claim 1, wherein accessing the training data comprises collecting IoCs, security observables, and artifacts of users within the security system.

3. The method of claim 1, wherein accessing the training data comprises scanning enriched IoCs, security observables, and artifacts within the security system.

4. The method of claim 1, further comprising splitting the enriched training data into sets based on a maliciousness, the sets comprising a first set corresponding to benign activities and a second set corresponding to malicious activities.

5. The method of claim 1, wherein creating the clusters of users based on a similarity of the enriched training data between the users comprises identifying user affinity between users in a cluster of users.

6. The method of claim 5, wherein identifying the user affinity between users comprises identifying users having related attack surfaces in security operations.

7. The method of claim 5, wherein identifying the user affinity between users comprises identifying users having related missions in security operations.

8. The method of claim 5, wherein identifying the user affinity comprises identifying users targeted by a common malware campaign.

9. The method of claim 1, wherein creating the clusters of users based on a similarity of the enriched training data between the users comprises:

aggregating collected features for at least a first user;

defining a first user profile of aggregated features for the first user; and creating the clusters based on the first user profile.

10. A system, comprising:

a processor; and a memory, wherein the memory includes a computer program product configured to perform operations for identifying threat relevancy based on user affinity within a security system, the operations comprising:

accessing training data from a set of users within a security system, by a processor executing a security system platform in the security system, wherein the training data is automatically collected without any user interaction, and is based on an attack surface and monitored user entered queries of each user of the set of users, the monitored user entered queries including queries transmitted by users, of the set of users, requesting a risk assessment of data, the training data comprising at least one of: indicators of compromise (IoC), security observables, or artifacts;

enriching the training data, by the processor executing the security system platform, to generate enriched training data by:

applying a first enrichment operation to the training data to generate initial enriched training data, wherein the first enrichment operation uses collected feature data associated with at least one of the IoCs, security observables, or artifacts for the users, the collected feature data comprising at least one of email addresses, uniform resource locators (URLs), internet protocol (IP) addresses, or countries of origin; and applying a second enrichment operation to the initial enriched training data to generate the enriched training data, wherein the second enrichment operation uses types of vulnerabilities;

creating clusters of the users, by the processor executing the security system platform, based on a similarity of the enriched training data between the users;

determining a risk posture, by the processor executing the security system platform, of a cluster of users based on relevancy of a risk detected by a user in the cluster, wherein the relevancy of the risk is based at least in part on whether one or more other users in the cluster of users have previously queried about, or made an enrichment request, for the risk; and providing proactive notifications, without user input, by the processor executing the security system platform, to the cluster of users based on the relevancy of the risk detected by the user in the cluster.

11. The system of claim 10, wherein accessing the training data further comprises collecting enriched IoCs, security observables, and artifacts within the security system.

12. The system of claim 10, wherein creating the clusters of users based on a similarity of the enriched training data between the users comprises identifying user affinity between users in a cluster of users.

13. The system of claim 10, wherein identifying user affinity between users comprises identifying users having related attack surfaces in security operations.

14. The system of claim 10, wherein creating the clusters of users based on a similarity of the enriched training data between the users comprises:

aggregating collected features for at least a first user;

defining a first user profile of aggregated features for the first user; and creating the clusters based on the first user profile.

15. A computer program product for identifying threat relevancy based on user affinity within a security system, the computer program product comprising:

a computer-readable storage medium having computer-readable program code embodied therewith, the computer-readable program code executable by one or more computer processors to perform operations comprising:

accessing training data from a set of users within a security system, by a processor executing a security system platform in the security system, wherein the training data is automatically collected without any user interaction, and is based on an attack surface and monitored user entered queries of each user of the set of users, the monitored user entered queries including queries transmitted by users, of the set of users, requesting a risk assessment of data, the training data comprising at least one of: indicators of compromise (IoC), security observables, or artifacts;

enriching the training data, by one of the computer processors executing the security system platform, to generate enriched training data by:

applying a first enrichment operation to the training data to generate initial enriched training data, wherein the first enrichment operation uses collected feature data associated with at least one of the IoCs, security observables, or artifacts for the users, the collected feature data comprising at least one of email addresses, uniform resource locators (URLs), internet protocol (IP) addresses, or countries of origin; and applying a second enrichment operation to the initial enriched training data to generate the enriched training data, wherein the second enrichment operation uses types of vulnerabilities;

creating clusters of the users, by one of the computer processors executing the security system platform, based on a similarity of the enriched training data between the users;

determining a risk posture, by one of the computer processors executing the security system platform, of a cluster of users based on relevancy of a risk detected by a user in the cluster, wherein the relevancy of the risk is based at least in part on whether one or more other users in the cluster of users have previously queried about, or made an enrichment request, for the risk; and providing proactive notifications, without user input, by one of the computer processors executing the security system platform, to the cluster of users based on the relevancy of the risk detected by the user in the cluster.

16. The computer program product of claim 15, wherein accessing the training data within the security system comprises collecting enriched IoCs, security observables, and artifacts.

17. The computer program product of claim 15, wherein creating the clusters of users based on a similarity of the enriched training data between the users comprises identifying user affinity between users in a cluster of users.

18. The computer program product of claim 15, wherein identifying user affinity comprises identifying users having related attack surfaces in security operations.

19. The computer program product of claim 15, wherein creating the clusters of users based on a similarity of the enriched training data between the users comprises:

aggregating collected features for at least a first user;

defining a first user profile of aggregated features for the first user; and creating the clusters based on the first user profile.

* * * * *